United States Patent
Vandervort

(10) Patent No.: US 10,579,811 B2
(45) Date of Patent: Mar. 3, 2020

(54) SYSTEM FOR MANAGING MULTIPLE LEVELS OF PRIVACY IN DOCUMENTS

(71) Applicant: Xerox Corporation, Norwalk, CT (US)

(72) Inventor: David Russell Vandervort, Walworth, NY (US)

(73) Assignee: Xerox Corporation, Norwalk, CT (US)

(*) Notice: Subject to any disclaimer, the term of this patent is extended or adjusted under 35 U.S.C. 154(b) by 0 days.

(21) Appl. No.: 16/275,895

(22) Filed: Feb. 14, 2019

(65) Prior Publication Data
US 2019/0188400 A1    Jun. 20, 2019

Related U.S. Application Data

(63) Continuation of application No. 13/169,189, filed on Jun. 27, 2011, now Pat. No. 10,242,208.

(51) Int. Cl.
G06F 21/62    (2013.01)

(52) U.S. Cl.
CPC .. *G06F 21/6209* (2013.01); *G06F 2221/2113* (2013.01)

(58) Field of Classification Search
CPC ............... G06F 21/6209; G06F 2221/2113
See application file for complete search history.

(56) References Cited

U.S. PATENT DOCUMENTS

| | | | |
|---|---|---|---|
| 5,930,801 A | 7/1999 | Falkenhainer et al. | |
| 6,188,766 B1* | 2/2001 | Kocher | H04N 1/32101 358/405 |
| 7,610,285 B1* | 10/2009 | Zoellner | G06F 16/16 |
| 7,840,501 B1 | 11/2010 | Sallam | |
| 7,978,853 B2 | 7/2011 | Krishnapuram et al. | |
| 8,024,304 B2 | 9/2011 | Pulfer et al. | |
| 8,176,563 B2* | 5/2012 | Redlich | G06F 21/6209 713/166 |
| 2003/0002668 A1 | 1/2003 | Graunke et al. | |
| 2003/0037073 A1* | 2/2003 | Tokuda | G06F 17/271 715/234 |
| 2004/0148298 A1 | 7/2004 | Terasawa | |
| 2005/0022122 A1 | 1/2005 | Barrus | |
| 2005/0138110 A1* | 6/2005 | Redlich | C07K 14/70575 709/201 |
| 2006/0143459 A1 | 6/2006 | Villaron et al. | |
| 2006/0215233 A1 | 9/2006 | Hirai et al. | |
| 2006/0242558 A1 | 10/2006 | Racovolis et al. | |
| 2007/0106494 A1* | 5/2007 | Detlef | G06F 17/273 704/9 |
| 2008/0016372 A1* | 1/2008 | Staddon | G06F 21/6209 713/189 |
| 2008/0072290 A1* | 3/2008 | Metzer | G06F 16/2308 726/3 |

(Continued)

*Primary Examiner* — Techane Gergiso
(74) *Attorney, Agent, or Firm* — Budzyn IP Law, LLC

(57) ABSTRACT

There is provided a method and system to manage multiple levels of privacy in a document having a plurality of elements. In accordance with the method, a selection of a first element in the document is received. The first element is tagged with a selected first privacy level of a hierarchical privacy level list. The list includes a plurality of hierarchical levels of privacy associated with a controlling authority. A selection of a second element in the document is received. The selected second element is tagged with a selected second privacy level of the hierarchical privacy level list.

5 Claims, 8 Drawing Sheets

(56) References Cited

U.S. PATENT DOCUMENTS

| | | | |
|---|---|---|---|
| 2009/0077062 A1* | 3/2009 | Spivack | G06Q 30/02 |
| 2010/0162354 A1 | 6/2010 | Zimmerman et al. | |
| 2010/0179936 A1 | 7/2010 | Jeremiah | |
| 2010/0256994 A1* | 10/2010 | Eisenberger | G06Q 10/10 |
| | | | 705/3 |
| 2012/0005720 A1* | 1/2012 | McGloin | G06F 21/6263 |
| | | | 726/1 |
| 2012/0331571 A1* | 12/2012 | Vandervort | G06F 21/6209 |
| | | | 726/30 |

\* cited by examiner

700

Privacy Summary

Name: Medications and conditions
Controlling Authority: Health Insurance Portability and Accountability Act
Assigned Privacy Level: confidential
Effective Privacy Level: private
— 702

Privacy Officer

Organization: Jackson & Jackson Health Options, Inc.
Address: 4432 Jackson Rd., Macedon, NY 14529
Contact: Joseph Spaulding, Vice President of Privacy
Phone 315 589 0001                Email: privacy@jacksonhealth.com
— 704

Content statistics

| Number of private elements:      | 9  | Percent of private elements:      | 1.22 |
| Number of sensitive elements:    | 25 | Percent of sensitive elements:    | 2.96 |
| Number of confidential elements: | 8  | Percent of confidential elements: | 0.95 |

— 706

For a complete enumeration of privacy taggings, click here
[ Audit ] — 708

Export as: — 712
● Text   ○ html   ○ pdf
For readers cleared to level — 714
● open   ○ confidential   ○ sensitive   ○ private     — 710

☑ Include summary — 716
[ export ] — 718

*FIG. 7*

Privacy Summary

Name: Patient Dossier
Assigned Privacy Level: confidential
Highest Page Privacy Level: private
Controlling Authority: Company CEO Confidentiality Directive  ←— 802

Privacy Officer

Organization: Jackson & Jackson Health Options, Inc.
Address: 4432 Jackson Rd., Macedon, NY 14529
Contact: Joseph Spaulding, Vice President of Privacy
Phone 315 589 0001          Email: privacy@jacksonhealth.com  ←— 804

Pages

| Name | Effective Level |
|---|---|
| Medications and conditions | private |
| Admissions history | private |
| Protective medical decision document | sensitive |

←— 806

Export as: —810
◉ Text   ○ html   ○ pdf
For readers cleared to level —812
◉ open   ○ confidential   ○ sensitive   ○ private     ←— 808

☑ Include summary —814
[ export ] —816

*FIG. 8*

SYSTEM FOR MANAGING MULTIPLE LEVELS OF PRIVACY IN DOCUMENTS

BACKGROUND

Field

The present application relates to document management. More specifically, the present application is directed to a system and method of managing multiple levels of privacy in documents.

Brief Discussion of Related Art

It is common for documents to contain data (information) that, for legal or ethical reasons, can only be disclosed to some parties and not to others. These constraints have commonly been enforced at the file system level by designating documents (files) with security settings (e.g., "Top Secret") or requiring users to belong to specific security groups before being allowed to open the files. Efforts at applying privacy settings to contents of the documents have used a binary (e.g., private/not private) approach that fails to take into account legal and operational requirements, such as those created by the Health Insurance Portability and Accountability Act (HIPAA), for privacy disclosures to be tailored to different audiences.

Protecting private data is of both increasing importance and increasing complexity. In addition to traditional classifications of confidential data, trade secrets and financial information, web sites now have privacy policies that are the legal equivalent of contracts, while laws such as HIPAA and Gramm-Leach-Bliley Financial Services Modernization Act (GLBA) mandate that certain types of information be protected from inadvertent disclosure. Meanwhile, technology geared to make sharing and printing of documents easier increases the opportunities for inappropriate leakage of such information.

As an example, HIPAA designated certain health information that must be protected from disclosure such as name, birth date (except the year), social security and medical record numbers. Also included is less obvious information such as finger prints, facial photographs, web page addresses and even vehicle identification numbers. As another example, GLBA includes many of the same items, though not health information generally, but also includes any form of financial information that can be electronically transferred. Other laws regulating information disclosures include the Family Educational Rights and Privacy Act (FERPA), Children's Online Privacy Protection Act (COPPA) and, outside the United States, European Union Data Protection Directive and Canadian Privacy Act. Penalties for covered companies that fail to protect information as required by these laws can be extremely damaging. Even when companies are not covered by any privacy law, data leakage can result in lawsuits, loss of trade secrets and reduced credibility.

Current systems of privacy protection use binary protection schemes. In these schemes, a document is private or it is not. Consequently, protection of information is also binary. Either the document is correctly marked private and is protected, or it is not marked private and it is not protected. Binary protection of the document often means that much information that needs little or no protection is hidden, simply because it is on the same pages(s) as some information that is designated private in the document. Or worse, information that needs protection is left open because it is on the same page(s) as some information that is less private that people need to use. This shows how binary protection ignores the clear difference in privacy needs of different types of information. In most contexts, people's names do not need to be concealed. Social security numbers, however, can facilitate identity theft and should be carefully guarded.

SUMMARY

In accordance with an embodiment, a method of managing multiple levels of privacy in a document having a plurality of elements is disclosed. The method includes receiving a selection of a first element in the document. The first element is tagged with a selected first privacy level of a hierarchical privacy level list. The list includes a plurality of hierarchical levels of privacy associated with a controlling authority. The method further includes receiving a selection of a second element in the document. The selected second element is tagged with a selected second privacy level of the hierarchical privacy level list.

In accordance with an embodiment, a system to manage multiple levels of privacy in a document having a plurality of elements is disclosed. The system includes a tag editor. The tag editor is configured to receive a selection of a first element in the document and to tag the first element with a selected first privacy level of a hierarchical privacy level list. The list includes a plurality of hierarchical levels of privacy associated with a controlling authority. The tag editor is configured to receive a selection of a second element in the document and to tag the selected second element with a selected second privacy level of the hierarchical privacy level list.

These and other purposes, goals and advantages of the present application will become apparent from the following detailed description of example embodiments read in connection with the accompanying drawings.

BRIEF DESCRIPTION OF THE DRAWINGS

Some embodiments are illustrated by way of example and not limitation in the figures of the accompanying drawings in which:

FIG. 7 illustrates an example privacy graphical user interface;

FIG. 8 illustrates another example privacy graphical user interface; and

DETAILED DESCRIPTION

A system and method of managing levels of privacy in documents are disclosed herein. In the following description, for the purposes of explanation, numerous specific details are set forth in order to provide a thorough understanding of example embodiments. It will be evident, however, to one skilled in the art, that an example embodiment may be practiced without all of the disclosed specific details.

Figure 1:
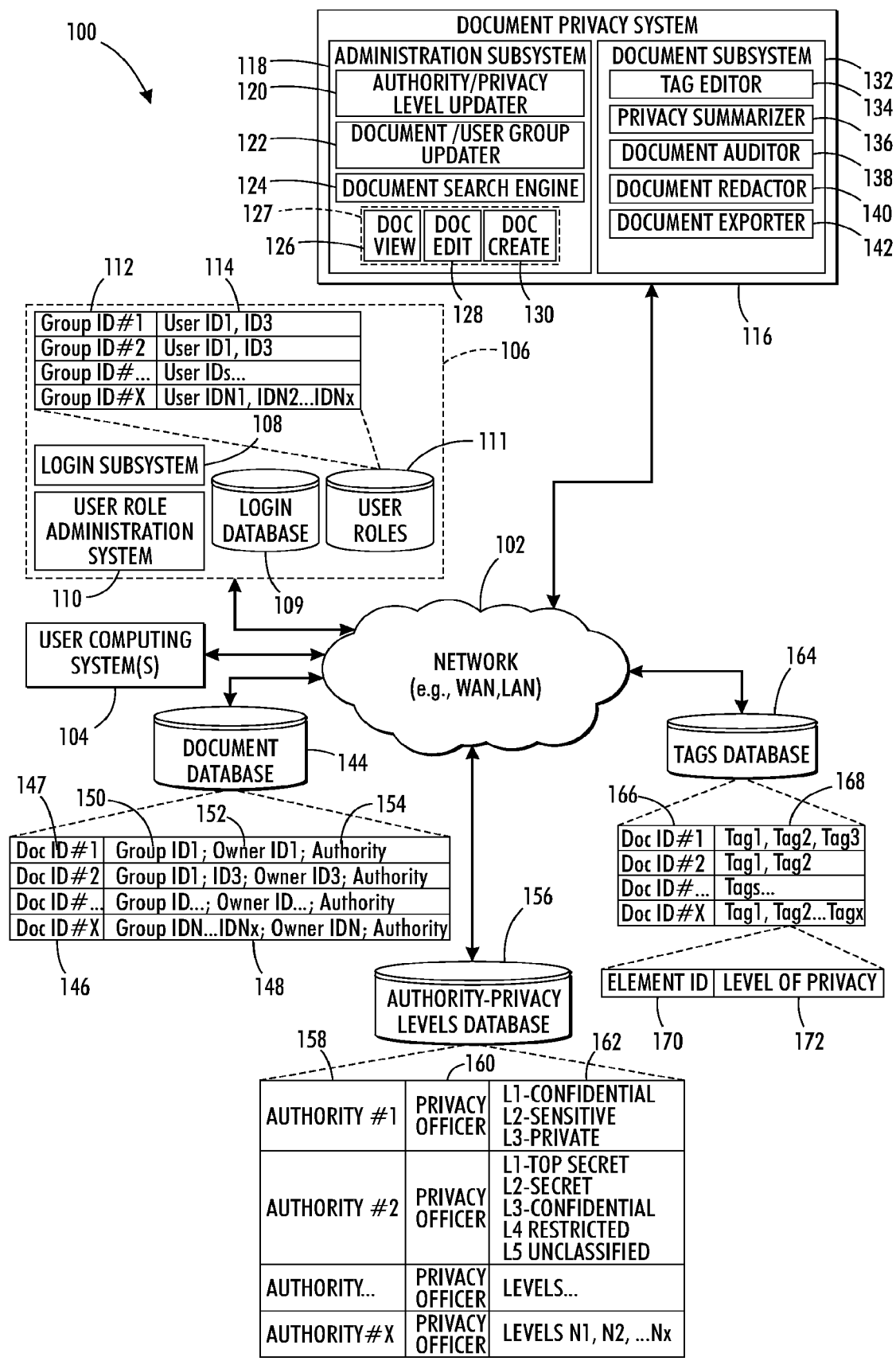
FIG. 1 illustrates an example document management system that includes a privacy system.

FIG. 1 illustrates an example document management system 100 that includes a privacy system 116. The document management system 100 includes a user administration/login system 106 and document privacy system 116 interconnected to user computing system(s) 104 via network 102. The network 102 can be a wide area network, local area network, or any combination of one or more networks configured to interconnect the systems, databases and other components of FIG. 1.

The user administration/login system 106 is configured to administer users in the document management system 100 and to enable users to login into the document management system 100 over the network 102 via user computing system(s) 104. The user administration/login system 106 includes a login subsystem 108, user authentication (or login) database 109, user role administration subsystem 110 and user roles database 111.

The login subsystem 108 is configured to login the user into the document management system 100, such as by authenticating the user via username and password. The username/password combinations and associated user IDs for users that are authorized to use the document management system 100 can be maintained in the user login database 109. Upon user login, the login subsystem 108 can authenticate a user's username and password received from the user computing system 104 against the username and password combinations in the user login database 109. After the user is authenticated, the user can access the document privacy system 116 via the user's user ID associated with the user's username/password combination. Alternative authentication methods and system components can be used to login the user to the document management system 100.

The user role administration subsystem 110 is configured to enable a system administrator to setup user roles for role-based access control to documents in the document privacy system 116. User roles can be maintained in the user roles database 111. Upon user login, login subsystem 108 is further configured to use the user's user ID to retrieve a role group to which the user belongs from user roles database 111, to facilitate user's role-based access control to documents in the document privacy system 116. The user roles database 111 includes a plurality of defined role groups identified by group ID 112. One or more user IDs 114 are associated with each group ID 112 in the user roles database 111. As an example, the user roles can be a human resource administrator, human resource specialist, system all groups. Additional examples of user roles can be author, editor, finance member, manager, privacy auditor, as well as any other user role (e.g., in an enterprise). Other user roles can be defined and maintained in the user roles database 111.

The document privacy system 116 is configured to manage multiple levels of privacy in documents and provide user access control to the documents having multiple levels of privacy. The document privacy system 116 includes an administration subsystem 118, document subsystem 132, and databases 144, 156, 164.

The administration subsystem 118 is configured to enable administration of documents and associated authority/privacy levels and user role groups. The administration subsystem 118 includes an authority/privacy level updater 120, document/user group updater 122, document search engine 124, and document access component 127.

The authority/privacy level updater 120 is configured to enable a user (e.g., an administrator) to update definitions of the authority/privacy level 158, 162 and privacy officer 160 (e.g., maintained in authority-privacy levels database 156) in the document privacy system 116.

The document/user group updater 122 is configured to enable a user to update associations 148 for one or more documents 146 (e.g., maintained in document database 144) in the document privacy system 116. For example, the document/user group updater 122 enables the user to update associations 148, such as the group ID (or user ID) 150 and controlling authority 154. Other associations can be maintained and updated for the documents 146.

The document search engine 124 is configured to enable a user to search and retrieve documents 146 (e.g., maintained in document database 144) in the document privacy system 116. A user can search for a document by group ID (or user ID) 150, owner ID 152, authority 154, document ID 147, text in the document, name of document, or any other mechanism to retrieve a desired document maintained in the document database 144.

The document access component 127 is configured to enable a user to retrieve an existing document or to create a new document. The document access component 127 includes a document view element 126, document edit element 128 and document create element 130. The document view element 126 is configured to allow a user to view a certain document from the document database 144 if the user (user ID) is associated with the document (document ID) as its owner (user ID) 152 or user of a role group (group ID) or a specific user (user ID) 150.

The document view element 128 is configured to allow a user to edit a certain document from the document database 144 if the user (user ID) is associated with the document (document ID) as its owner (user ID) 152 or user of a role group (group ID) or a specific user (user ID) 150.

The document create element 130 is configured to allow a user to create or generate a new document (document ID) 146 in the document database 144 and to associate that document with associations 148, such as a role group (group ID) or a specific user (user ID) 150 and controlling authority 154 in the document privacy system 116. The document create element 130 automatically assigns the user as owner (user ID) 152 in the associations 148 for the new document 146.

The document subsystem 132 is configured to allow a user to tag content (elements) in a document 146 with multiple levels of privacy for a controlling authority, to summarize and audit levels of privacy in the document 146, and to redact and export the content of the document 146 in accordance with tagged content and a selected export level of privacy. The document subsystem 132 includes a tag editor 134, privacy summarizer 136, document auditor 138, document redactor 140 and document exporter 142.

The tag editor 134 is configured to receive selections of elements (element IDs 170) in a document and to tag the elements of the document with multiple levels of privacy 172 for a controlling authority 154. An element can be a string of one or more text characters, numbers, symbols, tables, graphical, picture or other components in the document, as well as combinations of components. The components in the element can but do not have to be sequential, e.g., selected components can be separated by non-selected components. For example, a selection of a first element in a document can be received. The selection can be achieved by a user highlighting the desired element in the document. Highlighting can be sequential (e.g., using a mouse) or can be non-sequential (e.g., using the mouse and CTRL key on a keyboard). The first element can be tagged with a selected first privacy level (for a controlling authority) of a hierarchical privacy level list (e.g., maintained in authority-privacy levels database 156). The list includes a plurality of hierarchical levels of privacy associated with the controlling authority.

A selection of a second element in the document can be received. The selection of the second element can be similarly accomplished as described above in reference to the selection of the first element. The selected second element can be tagged with a selected second privacy level of the hierarchical privacy level list.

Tagging can be accomplished by selection of the appropriate authority/privacy level from a menu option or activating a hot-key via a keyboard. The process of tagging can be accomplished by generating tags for the selected elements described above (e.g., first tag and second tag, respectively). A tag includes an identification of the selected element in the document and identification of the selected privacy level for the controlling authority. The selected element can be identified by coordinates in the document, by starting and terminating locations, by starting locations and lengths, as well as myriad other ways of identifying the selected element. The tags can be saved for later access and retrieval (e.g., maintained in tags database 164). It is noted that some content (elements) in the document can be tagged while other content (elements) can remain untagged.

The privacy summarizer 136 is configured to summarize elements that are tagged in a document. For example, tags for the tagged document can be retrieved from the tags database 164. Summary can be provided based on number of elements tagged at different privacy levels and/or based on a percentage of different privacy elements out of total elements (tagged and untagged) in the document.

The document auditor 138 is configured to audit tagged elements of the document. For example, the document auditor can enumerate the tagged elements and their respective privacy levels, such as by retrieving and displaying the tagged elements from the document and their associated privacy levels from the tags database.

The document redactor 140 is configured to receive a selection of an export privacy level of the list of privacy levels from a user and further configured to redact the tagged elements in the document above the export level of privacy. The document redactor 140 can substitute elements in the document above the export level with substituted elements to protect privacy. Substituted elements can include blanks or other text characters, numbers, symbols, tables, graphical or other components to eliminate the original elements which are substituted.

The document exporter 142 is configured to export the elements of the document as redacted to a second export document. For example, the original elements that are not tagged (and elements tagged at or below the export level of privacy) can be exported without change, while the substituted elements can be exported in place of the elements tagged above the export level of privacy. Accordingly, the export document receives the elements of the document as redacted, protecting privacy of the elements that are tagged above the export level of privacy.

The export document can be transmitted to a recipient (e.g., recipient at HIPAA), such as via the network 102 (e.g., email) or via conventional mail. Moreover, the export document can be stored in the document database 144, inheriting associations 148 of the original document from which it was exported. The export document can also be processed in the document privacy system 116 similarly to the original document, e.g., tagged, redacted and exported.

The document database 144 is configured to maintain documents associated with multiple levels of privacy. The documents 146 can be identified by document IDs 147. The document database 144 further maintains associations 148 with the document IDs 147. The associations 148 for a document (document ID) can be maintained in a table of the database 144 and can include group ID (or user ID) 150 to which users belong, owner (user ID) of the document 152 and controlling authority 154. Other associations 148 can be provided, such as, for example, access permissions (read/write) of documents 146 and update permissions of the associations 148 for group ID (or user ID) 150.

The authority-privacy levels database 156 is configured to maintain one or more controlling authorities 158 and an associated privacy officer 160 and levels of privacy 162 for each controlling authority 158. In an enterprise, a privacy officer can be responsible for the enforcement of privacy constraints associated with a controlling authority, such as HIPAA.

The tags database 164 is configured to maintain document IDs 166 and associated privacy tag 168. A tag 168 identifies an element 170 in the document and its level of privacy 172. In some embodiments, the tag 168 can maintain a level of privacy tuple 172 that identifies the controlling authority and the associated level of privacy. The element can be identified by coordinates in the document, by starting and terminating locations, by starting locations and lengths, as well as one of myriad other ways of identifying the element.

Figure 2:
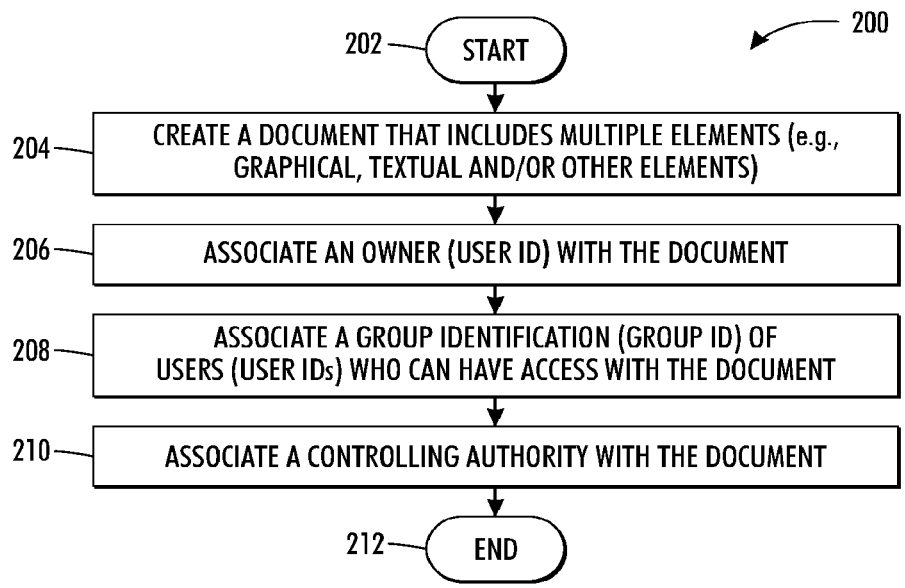
FIG. 2 illustrates a flowchart of an example method of associating a document with a controlling authority and a level of privacy for the controlling authority.

FIG. 2 illustrates a flowchart of an example method 200 of associating a document with a controlling authority. The example method 200 starts at operation 202. At operation 204, a user can create a document that includes multiple elements. For example, the user can create a document in the document database 144 via document create component 130 of the administration subsystem 118 in the document privacy system 116. An element can include text, numbers, symbols, tables, graphical, picture and/or other component. The document created can be, for example, a word processing document (e.g., Word document), a portable document format document (e.g., PDF document), or graphics document (e.g., JPEG document), or any another document that includes multiple elements. At operation 206, an owner is associated with the document. For example, the document create component 130 can associate the user's user ID with the document ID as the owner of the document in the document database 144.

At operation, 208, the user associates a group identification (e.g., group ID) and/or user ID of user who can have access to the document (document ID) in the document database 144 of the document privacy system 116. For example, the user can associate a user group and/or user via the document/user group updater 122 in the administration subsystem 118. At operation 210, the user can associate a controlling authority with the document (document ID) in the document database 144 of the document privacy system 116. For example, the user can associate the controlling authority with the document via the document create element 130, such as via selection of controlling authority 158.

In some embodiments, the document create element 130 can automatically associate the controlling authority with the document based on the user's group ID 150 or user ID 152. This can be useful in cases where different user groups of an enterprise are responsible for different controlling authorities. In other cases, where the controlling authority is enterprise-wide (e.g., HIPAA), the document create element 130 can automatically assign the controlling authority irrespective of the user's group ID 150 or user ID 152. It should be noted that the user can generally update the associations 148 described herein for the newly created document or document already maintained in the document database 144 by using document edit element 128 and document/user group updater 122 in the administration subsystem 118. In some cases, the update of associations 148 can be restricted based on permissions provided in the document database 144, such that a user cannot change the group ID 150 or change the controlling authority 154. Thereafter, the example method 200 ends at operation 212.

Figure 3:
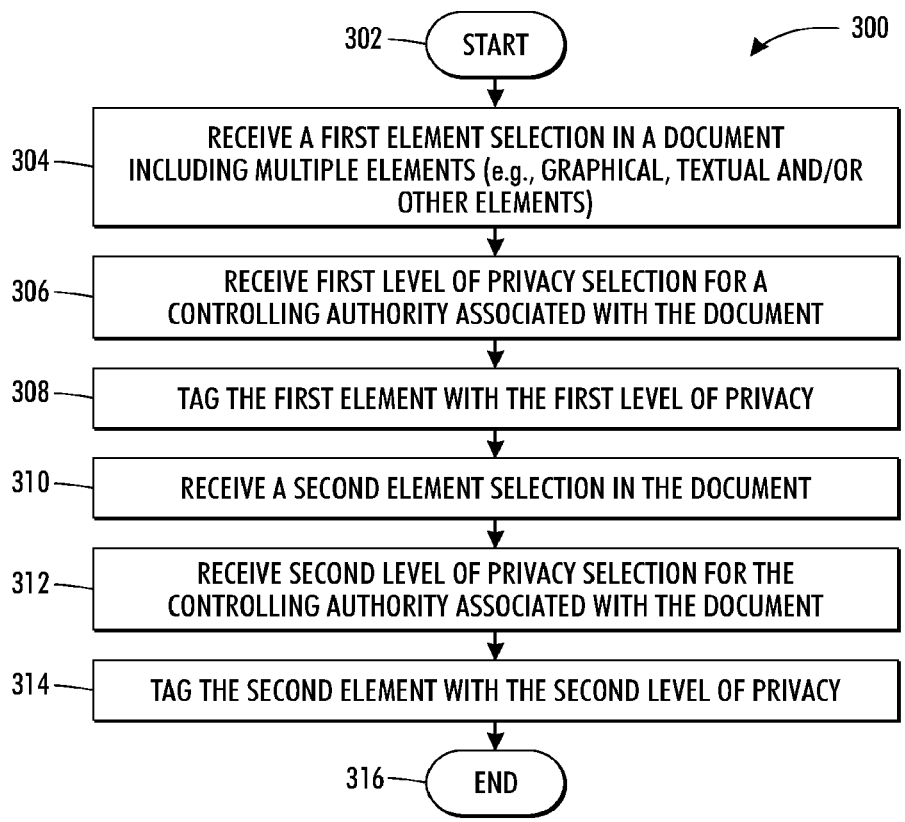
FIG. 3 illustrates a flowchart of an example method of tagging content of a document with multiple privacy levels.

FIG. 3 illustrates a flowchart of an example method 300 of tagging content of a document with multiple privacy levels. This example method is applicable to the embodiments illustrated in FIG. 1 and FIG. 6. The example method 300 starts at operation 302. At operation 304, the document subsystem 132 (e.g., tag editor 134) or document privacy system 618 (e.g., tag editor 628) receives from a user a first element selection in a document that includes multiple elements. It is noted that one or more components in the document can be selected as the first element at operation 304, such as textual and/or graphical elements. For example, the selection of the first element can be accomplished by highlighting. At operation 306, the document subsystem 132 (e.g., tag editor 134) or document privacy system 618 (e.g., tag editor 628) receives a first level of privacy selection for a controlling authority associated with the document. At operation 308, the document subsystem 132 (e.g., tag editor 134) or document privacy system 618 (e.g., tag editor 628) tags the first element with the first level of privacy. The first tag can be stored in the tags database 164 or in the storage 632 of the document 604, as will described below with reference to FIG. 6.

At operation 310, the document subsystem 132 (e.g., tag editor 134) or document privacy system 618 (e.g., tag editor 628) receives from a user a second element selection in the document. It is reiterated that one or more one or more components in the document can be selected as the second element. For example, the selection of second element can be accomplished by highlighting. At operation 312, the document subsystem 132 (e.g., tag editor 134) or document privacy system 618 (e.g., tag editor 628) receives a second level of privacy selection for the controlling authority associated with the document. The second level of privacy is different from the first level of privacy. At operation 314, the document subsystem 132 (e.g., tag editor 134) or document privacy system 618 (e.g., tag editor 628) tags the second element with the second level of privacy. The second tag can be stored in the tags database 164 or in the storage 632 of the document 604, as will described below with reference to FIG. 6. Thereafter, the example method 300 ends at operation 316.

While only the first element and the second element are described for clarity and brevity with reference to FIG. 3, it should be noted that one or more elements in the document can be tagged with the first level of privacy. Similarly, one or more elements in the document can also be tagged with the second level of privacy. Moreover, other elements in the document can be tagged with other levels of privacy for the controlling authority.

Figure 4:
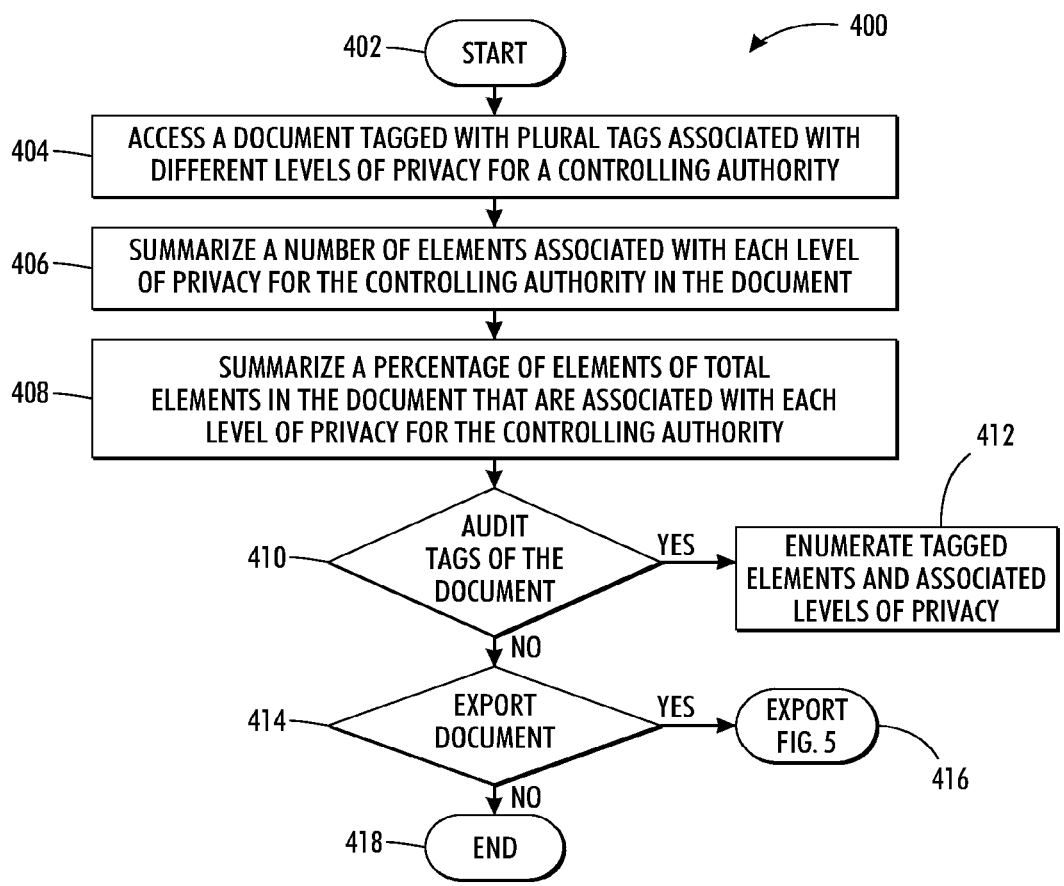
FIG. 4 illustrates a flowchart of an example method of summarizing and auditing tags of content in a document.

FIG. 4 illustrates a flowchart of an example method 400 of summarizing and auditing tags of content in a document. The method 400 begins at operation 402. At operation 404, a document tagged with plural tags associated with different levels of privacy for a controlling authority can be accessed. For example, the user can use the view document element 126 to access the document. The document can be presented to the user and the tagged elements indicated in the document via a display of the user computing system 104. These tags can be obtained from storage, such as from the tags database 164 in FIG. 1 or from the storage 632 of the document 604 in FIG. 6.

At operation 406, a number of elements associated with each level of privacy for the controlling authority can be summarized (e.g., as described with reference to FIG. 7). At operation 408, a percentage of elements of total elements in the document that are associated with each level of privacy for the controlling authority can be summarized (e.g., as described with reference to FIG. 7).

At operation 410, a determination is made as to whether tags of the document should be audited. This can involve a user requesting auditing of the different tags for the document. For example, the document auditor 138 can receive a user request to audit tags of the document. If the user chooses to audit tags, then at operation 412 the tagged elements and their associated levels of privacy are enumerated for the user, such as via a display of the user computing system 104. For example, the document auditor 138 can retrieve the tags for the tagged elements from the tags database 164 in FIG. 1 or from the document 604 in FIG. 6. The document auditor 138 can further retrieve the content (elements) identified by the retrieved tags from the document. Alternatively, if the user does not choose to audit tags, then the method 400 continues at operation 414.

At operation 414, a determination is made as to whether the document should be exported. This can involve a user requesting export of the document. For example, the document exporter 142 can receive a user request to export the document. If user chooses to export the document, then the method 400 continues at operation 416 to export the document. An example method to export the document is described below with reference to FIG. 5. Alternatively, if user chooses not to export the document, the method 400 ends at operation 418.

Figure 5:
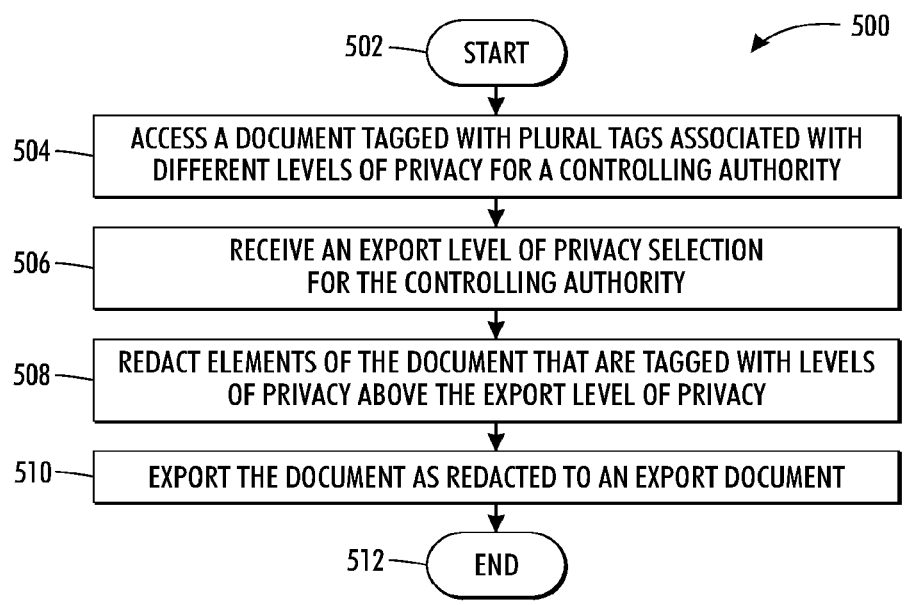
FIG. 5 illustrates a flowchart of an example method of redacting tagged content in a document and exporting the document as redacted.

FIG. 5 illustrates a flowchart of an example method 500 of redacting tagged content in a document and exporting the document as redacted. The method 500 begins at operation 502. At operation 504, a document tagged with plural tags associated with different levels of privacy for a controlling authority can be accessed. At operation 506, an export level of privacy for the controlling authority can be received. For example, the document exporter 142 can receive export level 162 selected by a user. For example, the export level for the controlling authority associated with the document in the document database 144 can be selected from the hierarchical privacy level list in the authority-privacy levels database 156.

At operation 508, elements of the document that are tagged with levels of privacy above the export level of privacy are redacted. For example, the redaction can be accomplished by the document redactor 140, substituting elements above the export level with substitute elements to protect privacy. The document redactor 140 can substitute elements of the document above the export level with substituted elements that can include blanks or other text characters, numbers, symbols, tables, graphical or other components to eliminate the original elements which are substituted.

At operation 510, the elements of the document as redacted are exported to an export document. For example, the document exporter 142 can export the elements of the document as redacted to the export document. The original elements that are not tagged (and elements tagged at or below the export level of privacy) in the document can be exported without change, while the substituted elements can be exported in place of the elements tagged above the export level of privacy. Accordingly, the export document receives the elements of the document as redacted to protect privacy of the elements that are tagged above the export level of privacy. The method 500 ends at operation 512.

Figure 6:
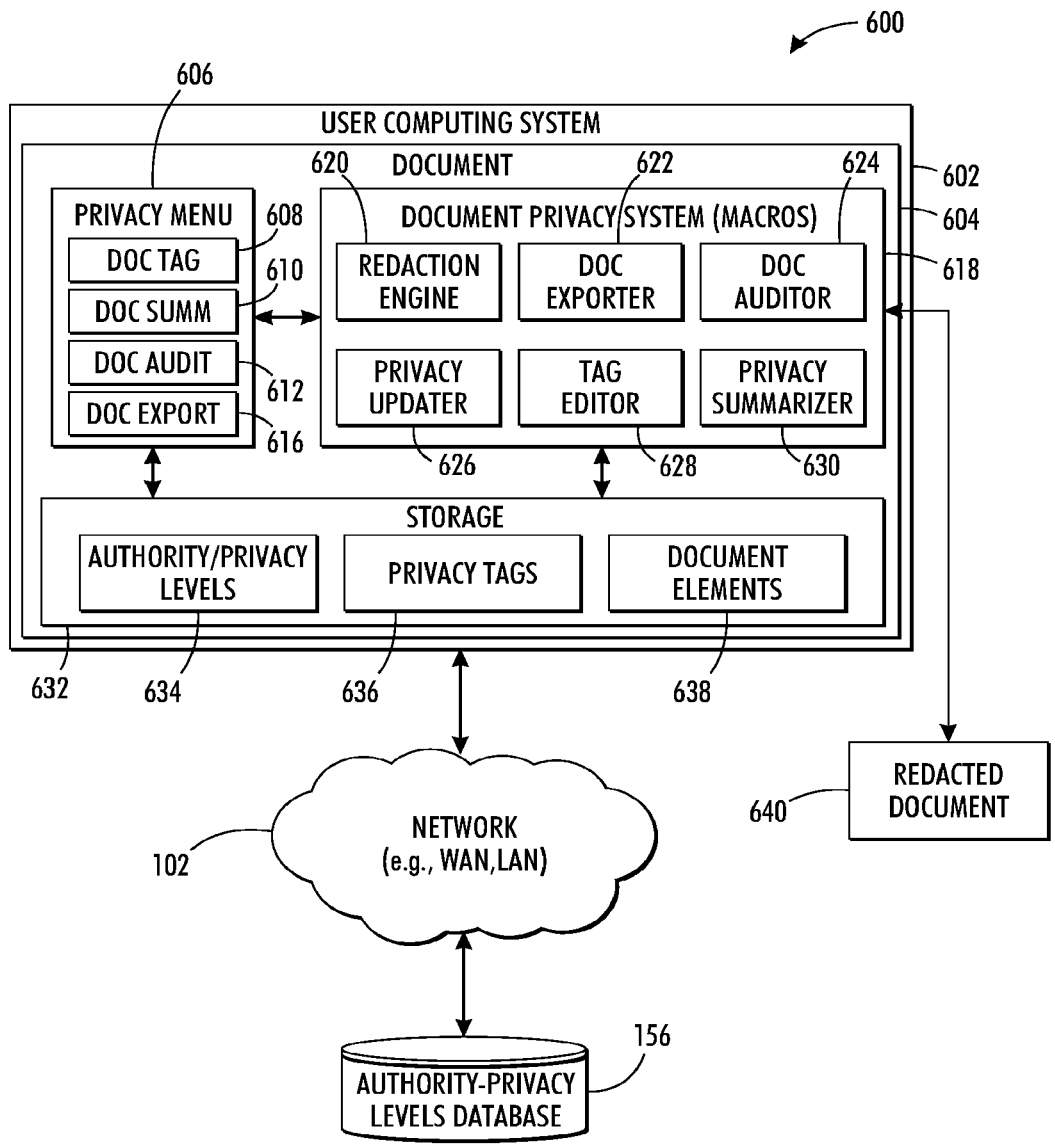
FIG. 6 illustrates an example document that includes a privacy subsystem.

FIG. 6 illustrates an example document 604 that includes a document privacy system 618 in a document management system 600. In the document management system 600, the document privacy system 618 is not distributed and travels with the document 604. The user computing system 602 is configured to maintain the example document 604, which can include multiple (e.g., different) levels of privacy. The document can be, for example, a word processing document (e.g., Word document), a portable document format document (e.g., PDF document), or graphics document (e.g., JPEG document), or any another document that includes multiple elements of content.

The document 604 includes a privacy menu 606, document privacy system (macros) 618, and storage 632. The privacy menu 606 includes menu options: document tag 608, document summarize 610, document audit 612 and document export 616. The menu options in the menu 606 are configured to invoke associated functionality (macros) in the document privacy system 618: tag editor 628, privacy summarizer 630, document auditor 624 and document exporter 622. Additional functionality (macros) provided in the document privacy system 618 includes: a redaction engine (document redactor) 620 and authority/privacy level updater 626.

The document exporter 622 is configured to receive a selection of an export privacy level of the list of privacy levels 634 from a user and further configured to redact via document redaction engine 620 the tagged elements in the document above the export level of privacy. The redaction engine 620 can substitute elements above the export level with substituted elements to protect privacy. Substituted elements eliminate the original elements. The document exporter 624 is further configured to export the elements of the document as redacted to a redacted document 640. For example, the original elements that are not tagged (and elements tagged at or below the export level of privacy) can be exported without change, while the substituted elements can be exported in place of the elements tagged above the export level of privacy.

The document auditor 624 is configured to audit tagged elements of the document. For example, the document auditor can enumerate the tagged elements and their respective privacy levels, such as by retrieving and displaying tagged elements from the document elements 638 and their associated privacy levels from privacy tags 636.

The tag editor 628 is configured to receive selections of elements and to tag the elements with multiple levels of privacy for a controlling authority. An element can be a string of one or more text characters, numbers, symbols, tables, graphical, picture or other components in the document, as well as combinations of components. The components in the element can but do not have to be sequential, e.g., selected components can be separated by non-selected components. For example, a selection of a first element in the document can be received. The selection can be achieved by a user highlighting the desired element in the document. Highlighting can be sequential (e.g., using a mouse) or can be non-sequential (e.g., using the mouse and CTRL key on a keyboard). The first element can be tagged with a selected first privacy level (for a controlling authority) of a hierarchical privacy level list (e.g., maintained in authority-privacy levels table 634 in storage 632 of the document 604). The table includes a plurality of hierarchical levels of privacy associated with the controlling authority.

A selection of a second element in the document can be received. The selection of the second element can be similarly accomplished as described above in reference to the selection of the first element. The selected second element can be tagged with a selected second privacy level of the hierarchical privacy level list.

Tagging can be invoked by selection of the appropriate privacy level from a menu option or activating a hot-key via a keyboard. The process of tagging can be accomplished by generating tags for the selected elements described above (e.g., first tag and second tag, respectively). A tag includes an identification of the selected element in the document and identification of the selected privacy level for the controlling authority. The selected element can be identified by coordinates in the document, by starting and terminating locations, by starting locations and lengths, as well as myriad other ways of identifying the selected element. The tags can be saved for later access and retrieval in the privacy tags 638 of storage 632 in document 604. It is noted that some content (elements) in the document can be tagged while other content (elements) can remain untagged.

The privacy summarizer 630 is configured to summarize elements that are tagged in the document. For example, tags for the tagged document can be retrieved from the privacy tags 636. Summary can be provided based on number of elements tagged at different privacy levels and/or based on a percentage of different privacy elements out of total elements (tagged and untagged) in the document.

The document auditor 624 is configured to audit tagged elements of the document. For example, the document auditor can enumerate the tagged elements and their respective privacy levels, such as by retrieving and displaying the tagged elements from the document elements 638 and their associated privacy levels from privacy tags 636 in the storage 632 of the document 604.

The redaction engine (document redactor) 620 is configured to receive a selection of an export privacy level of the list of privacy levels from a user and further configured to redact the tagged elements in the document above the export level of privacy. The redaction engine 620 can substitute elements in the document above the export level with substituted elements to protect privacy. Substituted elements can include blanks or other text characters, numbers, symbols, tables, graphical or other components to eliminate the original elements that are substituted.

The authority/privacy level updater 626 is configured to determine when there is access to the authority-privacy levels database 156 of the network 102 and further configured to update the authority/privacy levels 634 in the storage 632 of the document 604.

The storage area (storage) 632 includes authority/privacy levels 634, privacy tags 636 and document elements 638 in the document 604. The authority/privacy levels 634 can be a table that maintains the controlling authority information and different levels of privacy for the controlling authority. The levels of privacy can be selected by the user in tagging elements in document elements 638 of the document 604. The privacy tags 636 maintains information concerning which elements in the document 604 are tagged with certain privacy levels for the controlling authority.

The redacted document 640 can be maintained in the user computing system 602 and can further be transmitted to a recipient (e.g., recipient at HIPAA), such as via the network 102 (e.g., email) or via conventional mail. Moreover, the redacted document 640 can inherit the structure of the document 604 (e.g., menu 606, macros 618 and storage 632) and the authority/privacy levels set forth in 634 of the original document 604. The redacted document 640 can also be processed in the user computing system 602 similarly to the original document 604, e.g., tagged, redacted and exported.

FIG. 7 illustrates an example privacy graphical user interface (GUI) 700 for a document. The GUI 700 includes privacy summary section 702, privacy officer section 704, content statistics section 706, privacy tag enumeration section 708 and export section 710. The GUI 700 is for a hypothetical patient's medical history that contains information assigned several levels of privacy.

The privacy summary section 702 can identify the name of the document, controlling authority, privacy level assigned to the document, as well as an effective privacy level calculated from the tags of the document. The effective privacy level can be a highest level amongst the tagged elements in the document. For example, the effective privacy level can be stored and maintained for a document 146 in the associations 148 of document database 144, or in storage 632 of document 604.

The privacy officer section 704 can identify the organization (and address) of the company that generated the document, as well as the privacy officer of the company (and privacy officer's telephone and email address) responsible for maintaining privacy in connection with the controlling authority in privacy summary 702. For example, the organization (and address) and privacy officer (and telephone, email address) can be stored and maintained in privacy officer 160 of the authority-privacy levels database 156, or in storage 632 of document 604.

The content statistics section 706 can identify how many instances or elements of each level of privacy are in the document as well as what percentage of the total elements is assigned to each level of privacy. This information can be obtained once elements are tagged at any given level of privacy. In various embodiments, tagging can be accomplished as described hereinabove with reference to FIGS. 1 and 6, respectively.

In alterative embodiments in FIG. 6, a function or (macro) can apply privacy tags similar to XML tags to the elements of the document to specify privacy levels for the elements. For example, the tag editor 628 can tag the elements in the document 604, e.g., inserting tags directly into the content of the document in the document elements 638. In such embodiments, the privacy tags 636 can be omitted from the storage 632. The macro can globally tag certain elements. For example, if the name "John Smith" is to be considered confidential in the document, the macro can seek out every instance of "John Smith" in the document and tag it to read "[confidential]John Smith[/confidential]". The square brackets, which deviate from XML syntax, are used for convenience and visibility. Many other tagging formats are possible, including true XML.

Once content of the document is tagged or otherwise assigned privacy levels, discovering the tags of the document and summarizing them can provide information at a glance as to what level of privacy the document requires. For example, privacy summarizer 136 or 630 can summarize the tags as described with reference to FIGS. 1 and 6, respectively. In alterative embodiments in FIG. 6, the 630 can summarize the tags in the document elements 638 based on the above format, such as XML. As can be seen in privacy summary 702 and privacy officer 704, data describing the controlling authority (HIPAA in this case) and the privacy officer contact information are provided. All organizations covered by HIPAA are required to have a designated privacy officer and to publish the associated contact information. While the presence of this type data is not required, it is certainly aids both in auditing and legal compliance with privacy requirements.

The privacy tag enumeration section 708 enables a complete enumeration (audit) of privacy tags. Specifically, the privacy tag enumeration section 708 can display the tagged elements of the document and their associated privacy levels on a display. For example, document auditor 138 or 624 can audit the tags of the document as described with reference to FIGS. 1 and 6, respectively. In alterative embodiments in FIG. 6, document auditor 624 can audit the tags in the document elements 638 based on the above format, such as XML.

The export section 710 provides configuration controls 712, 714 and 716 as well as export of the document 718. For example, the document exporter 142/622 coupled with the document redactor 140/620 can provide the export/redaction functionality. Exporting the document generates a new document that can be printed or electronically transmitted to another person, with a level of privacy protection appropriate for that person. For example, if the health information shown is to be printed for use by a medical technician, the private, personally identifiable information, probably including a social security number or some other such data should be hidden, while more pertinent health details should be shown.

The user can choose an export format (e.g., text, html and pdf) and an export privacy level 714, followed by export of the document 718, which will export only the elements at or below the export level of privacy while redacting (substituting) the elements above the export level of privacy. For example, the document redactor 140/620 can be invoked by the document exporter 142/622 and can redact the elements above the export privacy level 714, while the document exporter 142/622 can export the elements as redacted to the new document.

In the example illustrated in FIG. 7, there are 4 privacy level options:

1. Open Level: an open document has no privacy level of protection. Therefore, when exported for a user who is only allowed to see open documents, all elements marked for any level of privacy are redacted. Redaction can involve replacement of the tagged elements text with substitute elements (e.g., elements to be redacted can be replaced with Xs).

2. Confidential level: when exported at this level, elements tagged confidential are revealed, sensitive and private information, being higher levels than confidential, are redacted.

3. Sensitive level: when exported at this level, all elements marked confidential or sensitive are displayed. Only the elements marked private are redacted.

4. Private level: since this is the highest level, when a document is exported at this level, nothing is redacted. This level of disclosure would probably be associated with someone with a very high level of privacy clearance, such as a vice president or even the chief privacy officer.

In different implementations, all elements can be exported except those elements that are associated with checked privacy levels in the export section 710. Then, instead of choosing one level as a cutoff point, the user can select all privacy levels that are desired to be redacted and only those elements tagged with these privacy levels would be redacted. This implementation can work well if there are multiple levels of privacy which are not hierarchical (e.g., university medical clinic). Accordingly, non-hierarchical privacy levels can be used with any embodiment described herein, such as in FIGS. 1 and 6.

For example, the bursar and the medical center personnel have completely different needs and different regulations for privacy to which they must adhere (FERPA for the bursar, HIPAA for the medical center). Accordingly, privacy levels such as "private-bursar" and "private-medical" can be used to show clearly when material should be showed or redacted.

FIG. 8 illustrates another example privacy graphical user interface (GUI) 800 for an aggregate document. The GUI 800 includes privacy summary section 802, privacy officer section 804, effective level of pages section 806, and export section 810.

The privacy summary section 802 can identify the name of the document, controlling authority, highest privacy level assigned to a page in the aggregate document and controlling authority for the document. For example, the highest privacy level can be stored and maintained for a document 146 in the associations 148 of document database 144, or in storage 632 of document 604.

The privacy officer section 804 can identify the organization (and address) of the company that generated the aggregate document, as well as the privacy officer of the company (and privacy officer's email address) responsible for maintaining privacy in connection with the controlling authority in privacy summary 802. For example, the organization (and address) and privacy officer (and telephone, email address) can be stored and maintained in privacy officer 160 of the authority-privacy levels database 156, or in storage 632 of document 604.

The effective level of pages 806 can identify effective level of privacy in different documents (medication and conditions, admission history, and protective medical decision document) of the aggregate document. The effective privacy level of a constituent document can be a highest level amongst the tagged elements in that document of the aggregate document. For example, the effective privacy level for each constituent document in the aggregate document can be stored and maintained for a document 146 in the associations 148 of document database 144, or in storage 632 of document 604.

Various technologies have made it easy to aggregate separate documents into larger documents. This has special consequences when disparate privacy-level documents are combined into a single aggregate document. Each of these constituent documents includes multiple elements of different levels of privacy. Also, a user can apply or assign a specific level of privacy to the aggregate document, though this is not required for the aggregate document. For example, the specific level of privacy for the aggregate document can be stored and maintained for a document 146 in the associations 148 of document database 144, or in storage 632 of document 604.

An effective level can be calculated for each constituent document from the highest of its assigned privacy levels. The effective level can also be calculated for the aggregate document that is the highest of its own assigned level and the highest effective level of its constituent documents. One or more of these effective levels can be stored and maintained for a document 146 in the associations 148 of document database 144, or in storage 632 of document 604.

The export section 808 provides configuration controls 810, 812 and 814 as well as export of aggregate document 816. For example, the document exporter 142/622 coupled with the document redactor 140/620 can provide the export/redaction functionality. Exporting the document generates a new document that can be printed or electronically transmitted to another person, with a level of privacy protection appropriate for that person. The export section 808 includes the same configuration controls as in GUI 700 of FIG. 7.

The exporting varies based on the constituent documents. A constituent document can be redacted and not exported if the effective privacy level of the constituent document is higher than the export level selected for the aggregate document. Moreover, a constituent document with a privacy level that is equal to or lower than the export privacy level will be exported and its content redacted based on the export privacy level. For example, the document redactor 140/620 can be invoked by the document exporter 142/622 and can redact the elements as described immediately above, while the document exporter 142/622 can export the elements as redacted to the new document.

Figure 9:
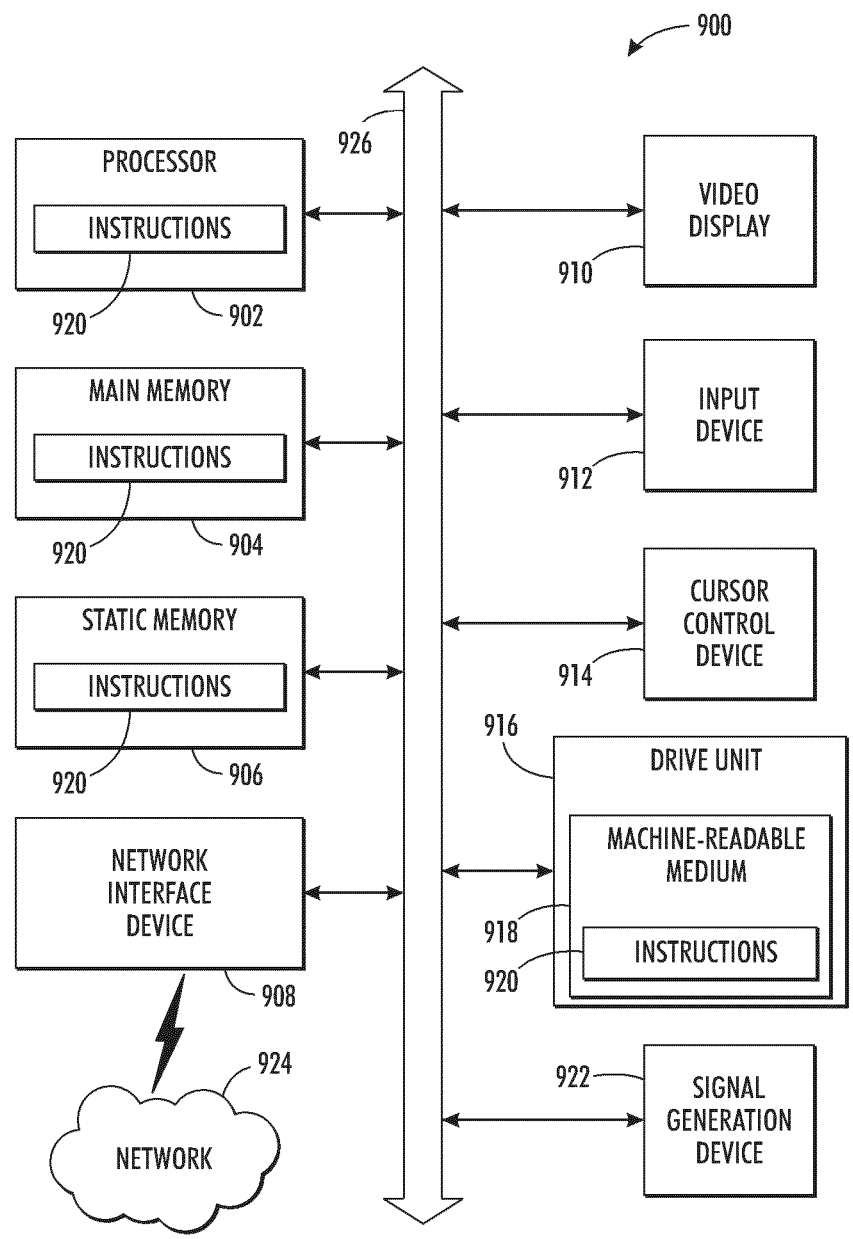
FIG. 9 is a block diagram of a general computer system that can perform any computer based functions or methods disclosed herein.

FIG. 9 is a block diagram of a general computer system 900. The computer system 900 may include a set of instructions that may be executed to cause the computer system 900 to perform any one or more of the computer based functions or methods disclosed herein. The computer system 900, or any portion thereof, may operate as a standalone device or may be connected, e.g., using a network, to other computer systems, databases and peripheral devices. The computer system 900 may, for example, be the user computing system 106, 602.

In a networked deployment, the computer system 900 may operate in the capacity of a document management system (or portion thereof) as illustrated in FIG. 1, for example. The computer system 900 may also be implemented as or incorporated into various devices, such as a personal computer (PC), a tablet PC, a personal digital assistant (PDA), a mobile device, a palmtop computer, a laptop computer, a desktop computer, a communications device, a control system, a scanner, a facsimile machine, a printer, a personal trusted device, a web appliance, or any other machine capable of executing a set of instructions (sequential or otherwise) that specify actions to be taken by that machine. Further, while a single computer system 900 is shown, the term "system" shall also be taken to include any collection of systems or sub-systems that individually or jointly execute a set, or multiple sets, of instructions to perform one or more computer functions as described herein.

As shown in FIG. 9, the computer system 900 may include a processor 902, e.g., a central processing unit (CPU), a graphics-processing unit (GPU), or both. Moreover, the computer system 900 may include a main memory 904 and a static memory 906 that may communicate with each other via a bus 926. As shown, the computer system 900 may further include a video display unit 910, such as a liquid crystal display (LCD), an organic light emitting diode (OLED), a projection unit, a television, a flat panel display, a solid state display, or a cathode ray tube (CRT). Additionally, the computer system 900 may include an input device 912, such as a keyboard, and a cursor control device 914, such as a mouse. The computer system 900 may also include a disk drive unit 916, a signal generation device 922, such as a speaker or remote control, and a network interface device 908.

In a particular embodiment, as depicted in FIG. 9, the disk drive unit 916 may include a computer-readable medium 918 in which one or more sets of instructions 920, e.g., software, may be embedded. Further, the instructions 920 may embody one or more of the methods or logic as described herein. In a particular embodiment, the instructions 920 may reside completely, or at least partially, within the main memory 904, the static memory 906, and/or within the processor 902 during execution by the computer system 900. The main memory 904 and the processor 902 also may include computer-readable media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments, the methods described herein may be implemented by software programs tangibly embodied in a processor-readable medium and may be executed by a processor. Further, in an exemplary, non-limited embodiment, implementations may include distributed processing, component/object distributed processing, and parallel processing. Alternatively, virtual computer system processing may be constructed to implement one or more of the methods or functionality as described herein.

The present application contemplates a computer-readable medium that includes instructions 920 or receives and executes instructions 920 responsive to a propagated signal, so that a device connected to a network 924 may communicate voice, video or data over the network 924. Further, the instructions 920 may be transmitted or received over the network 924 via the network interface device 908.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture signals such as those communicated over a transmission medium. A digital file attachment to an e-mail or other self-contained information archive or set of archives may be considered a medium that is equivalent to a tangible storage medium. Accordingly, the application is considered to include any one or more of a computer-readable medium and other equivalents and successor media, in which data or instructions may be stored.

Although the present application describes components and functions that may be implemented in particular embodiments with reference to particular standards and protocols, the application is not limited to such standards and protocols. Such standards and protocols are periodically superseded by faster or more efficient equivalents having essentially the same functions. Accordingly, replacement standards and protocols having the same or similar functions as those disclosed herein are considered equivalents thereof.

Thus, a system and method of managing multiple levels of privacy in documents have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments shown are described in sufficient detail to enable those skilled in the art to practice the teachings disclosed herein. Other embodiments may be utilized and derived therefrom, such that structural and logical substitutions and changes may be made without departing from the scope of this application. This Detailed Description, therefore, is not to be taken in a limiting sense, and the scope of various embodiments is defined only by the appended claims, along with the full range of equivalents to which such claims are entitled.

Although specific embodiments have been shown and described herein, it should be appreciated that any arrangement calculated to achieve the same purpose may be substituted for the specific embodiments shown. This application is intended to cover any and all adaptations or variations of various embodiments. Combinations of the above embodiments and other embodiments not specifically described herein, will be apparent to those of skill in the art upon reviewing the above description.

The Abstract is provided to comply with 37 C.F.R. § 1.72(b) and will allow the reader to quickly ascertain the nature of the technical disclosure of this application. It is submitted with the understanding that it will not be used to interpret or limit the scope or meaning of the claims.

In the foregoing description of the embodiments, various features may be grouped together in a single embodiment for the purpose of streamlining the disclosure of this application. This method of disclosure is not to be interpreted as reflecting that the claimed embodiments have more features than are expressly recited in each claim. Rather, as the following claims reflect, inventive subject matter lies in less than all features of a single disclosed embodiment.

What is claimed is:

1. A document privacy system to manage multiple levels of privacy in a document having a plurality of elements and to generate redacted documents based on the multiple levels of privacy, the document privacy system includes computer programming within the document such that the document privacy system travels with the document, the document privacy system comprising:
   a displayable privacy menu;
   a plurality of macros; and,
   a non-transitory storage;
   wherein, a first of the plurality of macros is a tag editor configured to:
      receive a selection of a first element in the document;
      tag the first element with a selected first privacy level of a hierarchical privacy level list as a first tag, the list including a plurality of hierarchical levels of privacy associated with a controlling authority, the first tag being stored in the non-transitory storage with an association of the first element and the selected first privacy level;
      receive a selection of a second element in the document; and tag the selected second element with a selected second privacy level of the hierarchical privacy level list as a second tag, the second tag being stored in the non-transitory storage with an association of the second element and the selected second privacy level;

wherein, a second of the plurality of macros is a document redactor configured to receive a selection of an export privacy level from the list based on an intended recipient of a second redacted document, the document redactor further configured to redact at least one of the first element and the second element from the elements of the document above the export level of privacy; and wherein, a third of the plurality of macros is a document exporter configured to export the elements of the document as redacted to the second redacted document, the second redacted document including a copy of the document privacy system.

2. The document privacy system of claim 1, wherein the document redactor is configured to substitute the at least one of the first element and the second element with a substituted element.

3. The document privacy system of claim 1, wherein, a fourth of the plurality of macros is a privacy summarizer configured to access the document, the privacy summarizer further configured to summarize elements tagged with the first privacy level and elements tagged with the second privacy level.

4. The document privacy system of claim 1, wherein, a fourth of the plurality of macros is a privacy summarizer configured to access the document, the privacy summarizer further configured to summarize a percentage of elements in the plurality of elements tagged with the first privacy level and a percentage of elements in the plurality of elements tagged with the second privacy level.

5. The document privacy system of claim 1, wherein, a fourth of the plurality of macros is a document auditor configured to audit tagged elements of the document, the document auditor further configured to enumerate the tagged elements and their respective privacy levels.

* * * * *